(12) United States Patent
Strock et al.

(10) Patent No.: US 7,887,929 B2
(45) Date of Patent: Feb. 15, 2011

(54) ORIENTED FIBER CERAMIC MATRIX COMPOSITE ABRADABLE THERMAL BARRIER COATING

(75) Inventors: Christopher W. Strock, Kennebunk, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 508 days.

(21) Appl. No.: 11/845,810

(22) Filed: Aug. 28, 2007

(65) Prior Publication Data

US 2009/0060747 A1  Mar. 5, 2009

(51) Int. Cl.
 B32B 18/00 (2006.01)
 B32B 15/04 (2006.01)
(52) U.S. Cl. .............. 428/633; 428/632; 428/472; 416/241 B; 501/35; 501/38
(58) Field of Classification Search .............. None
See application file for complete search history.

(56) References Cited

U.S. PATENT DOCUMENTS

| | | |
|---|---|---|
| 4,595,637 A | 6/1986 | Eaton |
| 4,738,902 A | 4/1988 | Prewo |
| 5,115,962 A | 5/1992 | Anderson |
| 5,178,922 A | 1/1993 | Ferrier |
| 5,198,282 A | 3/1993 | Baker |
| 5,200,370 A * | 4/1993 | Lennox et al. ............. 505/230 |
| 5,374,161 A | 12/1994 | Kelch |
| 5,376,598 A | 12/1994 | Preedy |
| 5,439,627 A * | 8/1995 | De Jager ................... 264/129 |
| 5,674,585 A | 10/1997 | Ewing |
| 6,284,323 B1 | 9/2001 | Maloney |
| 6,335,105 B1 * | 1/2002 | McKee ..................... 428/623 |
| 6,682,300 B2 | 1/2004 | Bolms |
| 6,893,214 B2 | 5/2005 | Alford |
| 6,924,040 B2 | 8/2005 | Maloney |
| 2005/0249602 A1 * | 11/2005 | Freling et al. ............ 416/241 B |
| 2008/0226879 A1 * | 9/2008 | Strock et al. ............. 428/195.1 |
| 2010/0021716 A1 * | 1/2010 | Strock et al. ............. 428/312.6 |

* cited by examiner

*Primary Examiner*—Aaron Austin
(74) *Attorney, Agent, or Firm*—Carlson, Gaskey & Olds PC

(57) ABSTRACT

A method of manufacturing a gas turbine engine component includes the steps of forming a ceramic workpiece having oriented ceramic reinforcement, and severing the ceramic workpiece to produce a ceramic member having a desired orientation of the ceramic reinforcement. The ceramic member is then attached to a turbine engine component as a thermal barrier layer for the turbine engine component.

16 Claims, 3 Drawing Sheets

ORIENTED FIBER CERAMIC MATRIX COMPOSITE ABRADABLE THERMAL BARRIER COATING

The government may have certain rights in this invention pursuant to Contract No. F33615-03-D-2354 awarded by the United States Air Force.

BACKGROUND OF THE INVENTION

This invention relates to protective thermal barrier layers and, more particularly, to abradable ceramic thermal barrier layers and methods of manufacture.

Components that are exposed to high temperatures, such as a component within a gas turbine engine, typically include protective coatings. For example, turbine blades, turbine vanes, and blade outer air seals typically include one or more coating layers that protect the component from erosion, oxidation, corrosion or the like to thereby enhance durability and/or maintain efficient operation of the engine. In particular, conventional outer air seals include an abradable ceramic coating that contacts tips of the turbine blades during engine operation such that the blades abrade the coating upon operation of the engine. The abrasion between the coating and the blade tips provides a minimum clearance between these components such that gas flow around the tips of the blades is reduced to thereby maintain engine efficiency. Typically, the coating is formed using a thermal spray process or the like to deposit and securely bond the coating on the component.

One drawback of the abradable ceramic coating is its vulnerability to erosion and spalling. For example, spalling may occur as a loss of portions of the coating that detach from the component. Loss of the coating increases clearance between the outer air seal and the blade tips and is detrimental to turbine engine efficiency and/or the durability of the air seal itself. One cause of spalling is the elevated temperature within the turbine section, which causes sintering of the ceramic coating. The sintering causes the coating to shrink, which produces stresses between the coating and the component. If the stresses are great enough, the coating may delaminate and detach from the component.

Accordingly, there is a need for a thermal barrier layer having enhanced thermal resistance to decrease or avoid spallation due to sintering shrinkage, and a method of manufacturing such a thermal barrier layer. This invention addresses those needs while avoiding the shortcomings and drawbacks of the prior art.

SUMMARY OF THE INVENTION

An example method of manufacturing a gas turbine engine component includes the steps of forming a ceramic workpiece having oriented ceramic reinforcement and severing the ceramic workpiece to produce a ceramic member having a desired orientation of the ceramic reinforcement. The ceramic member is then attached to a turbine engine component as a thermal barrier layer.

An example thermal barrier layer, such as a thermal barrier layer produced using the method above, includes ceramic fibers disposed within a matrix. The ceramic fiber comprises between about 5% and 66% of volume of the ceramic member and the matrix comprises a remainder of the volume. For example, the ceramic fibers and the matrix include at least one of zirconia, zirconia, stabilized zirconia, ytrria stabilized zirconia, hafnia, gadolinia, gadolina zirconate, mullite, or alumina. The matrix may also include porosity.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
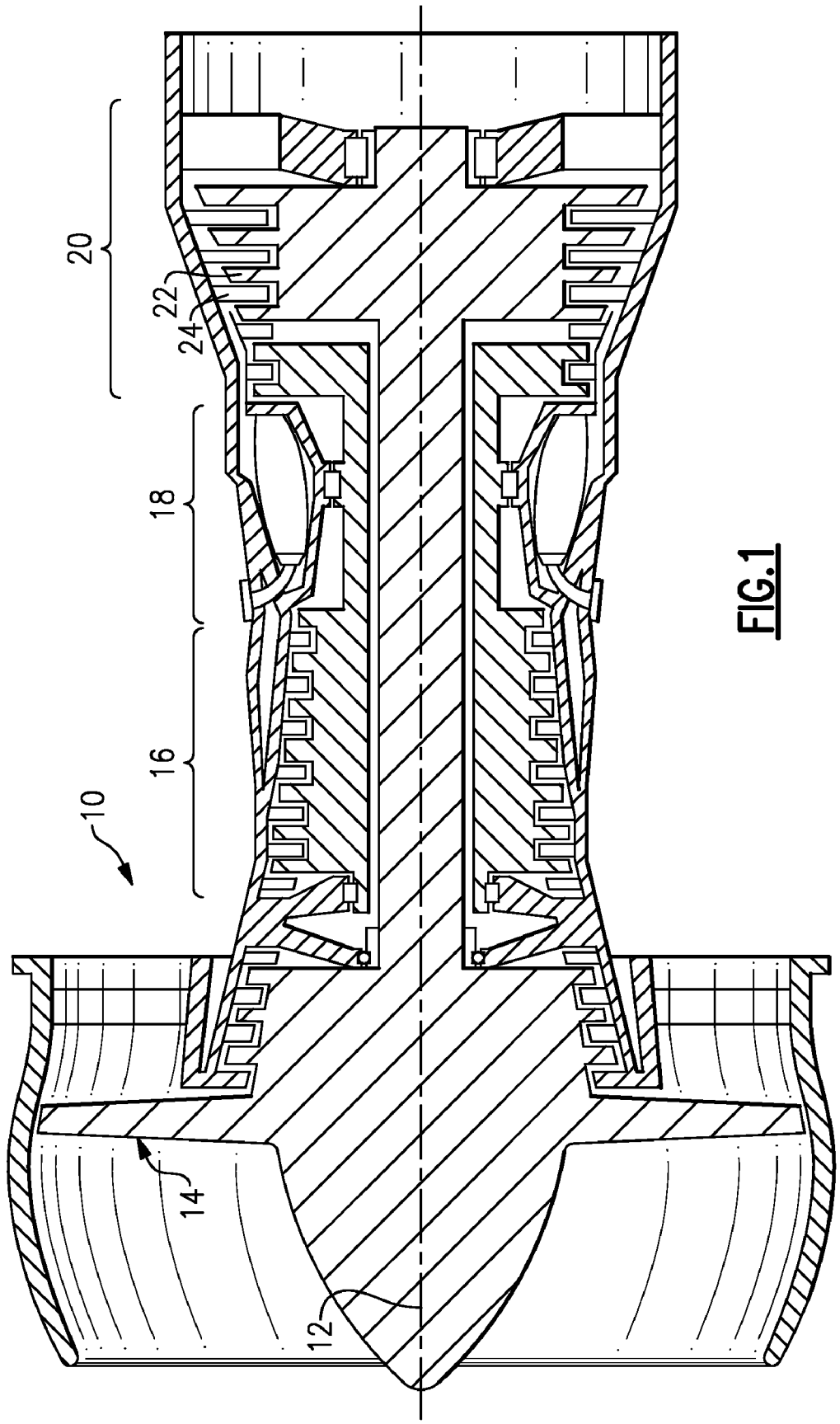
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18 and a turbine section 20 that includes turbine blades 22 and turbine vanes 24. As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
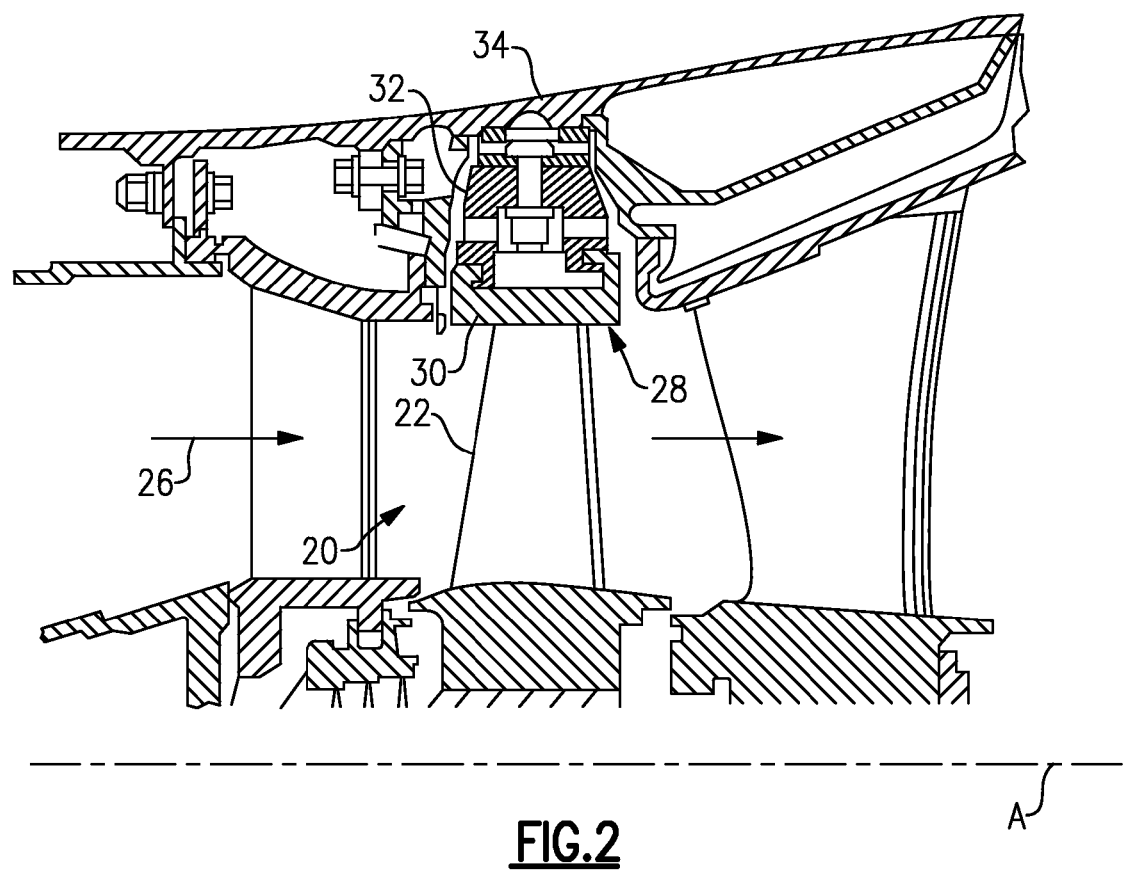
FIG. 2 illustrates a turbine section of the gas turbine engine shown in FIG. 1.

FIG. 2 illustrates selected portions of the turbine section 20. The turbine blade 22 receives a hot gas flow 26 from the combustion section 18 (FIG. 1). The turbine section 20 includes a blade outer air seal system 28 having a seal member 30 that functions as an outer wall for the hot gas flow 26 through the turbine section 20. The seal member 30 is secured to a support 32, which is in turn secured to a case 34 that generally surrounds the turbine section 20. For example, a plurality of the seal members 30 are circumferentially located about the turbine section 20. As can be seen in FIG. 2, the turbine section 20 includes two circumferential sides, a leading edge and a trailing edge, and a radially inner side and a radially outer side, where there is a thickness between the radially inner side and the radially outer side of about 150 mils (3.81 mm) or less.

Figure 3:
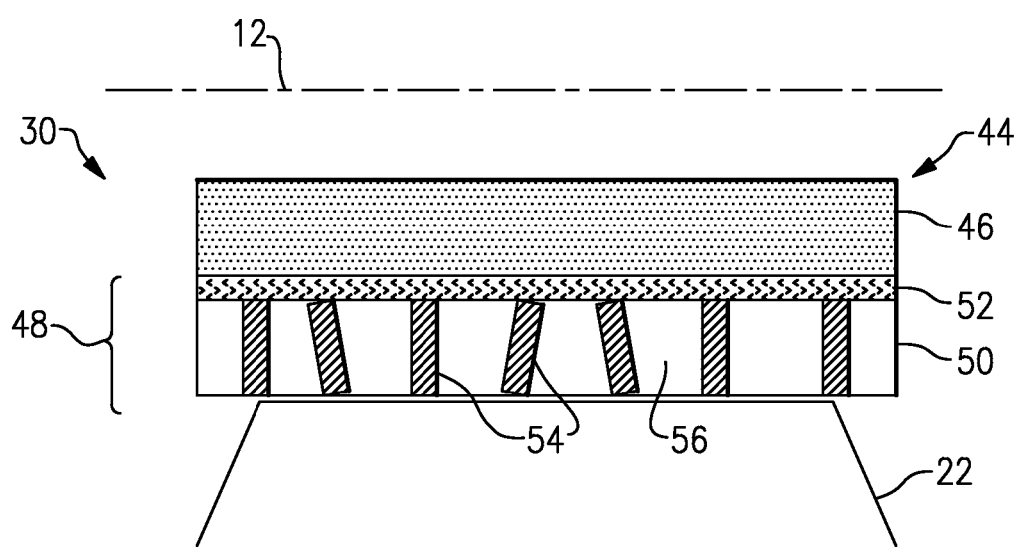
FIG. 3 illustrates a portion of a seal member within the turbine section of the gas turbine engine.

FIG. 3 illustrates an example portion 44 of the seal member 30. In this example, the seal member 30 includes a substrate 46 having a thermal barrier layer system 48 disposed thereon. The thermal barrier layer system 48 includes a ceramic member 50 that is bonded to the substrate 46. Optionally, a bond layer 52 bonds the ceramic member 50 to the substrate 46. In other examples, the ceramic member 50 is bonded directly to the substrate 46 without using the bond layer 52. Although a particular thermal barrier layer system 48 is shown, it is to be understood that the disclosed examples are not limited to the illustrated configuration and may include additional layers. Furthermore, although the disclosed example is for the seal member 30, it is to be understood that the examples here may also be applied to other type of engine or non-engine components.

The substrate 46 may include any suitable type of material for the seal member 30. In some embodiments, the substrate 46 comprises a nickel alloy, an iron alloy, or a ceramic. The bond layer 52 also may include any suitable type of bonding material. In some embodiments, the bond layer 52 includes a nickel alloy, platinum, gold, silver, or MCrAlY, where the M includes at least one of nickel, cobalt, iron, or a combination thereof, Cr is chromium, Al is aluminum and Y is yttrium. The ceramic member 50 comprises a ceramic composite that includes ceramic reinforcement 54, such as fibers, disposed within a matrix 56.

The ceramic reinforcement 54 may be oriented substantially perpendicular to a plane formed by the ceramic member 50. That is, the ceramic reinforcement 54 may be substantially aligned in a radial direction relative to the engine centerline 12. The term "substantially" as used in this description refers to a nominal geometry, such as within a desired tolerance. The orientation of the ceramic reinforcement 54 within the matrix 56 provides relatively weak paths between the ceramic reinforcement 54 for segmentation cracking, which relieves stresses within the ceramic member 50 at the temperatures produced during operation of the engine 10. The orientation of the ceramic reinforcement 54 also provides strength in the radial direction of the ceramic member 50 to inhibit lateral crack deflection and delamination of the ceramic member 50 due to the stresses.

The ceramic reinforcement 54 comprises between about 5% and about 66% of the volume of the ceramic member 50, and the matrix 56 comprises a remainder of the volume. For example, the matrix 56 may be a ceramic or ceramic composite having porosity. In a further example, the ceramic reinforcement 54 comprises between about 10% and 30% of the volume. The volume of the ceramic reinforcement 54 may be selected during formation of the ceramic member 50. For example, the selected volume may depend upon the percent theoretical density of the matrix 56 and a desired relative contribution of the ceramic reinforcement 54 to the radial strength of the ceramic member 50. For example, a larger volume of the ceramic reinforcement 54 may be used for relatively higher theoretical densities of the matrix 56 such that the fibers are present in a suitable amount to contribute the given amount to the radial strength of the ceramic member 50. For the same relative contribution to the radial strength, a lower volume of the ceramic reinforcement 54 may be used for relatively lower theoretical densities of the matrix 56. In one example, the percent theoretical density of the matrix 56 is between about 33% and 80% and the volume fraction of fibers is between about 10% and 60%.

In the above examples, the ceramic reinforcement 54 and the matrix 56 may be formed from any of a variety of different ceramic materials. For example, the ceramic reinforcement 54 and the matrix 56 are formed from at least one of zirconia, stabilized zirconia, yttria stabilized zirconia, hafnia, gadolinia, gadolinia zirconate, alumina, or mullite. The yttria stabilized zirconia may include between about 7 wt % and about 20 wt % of the yttria, although other amounts may alternatively be used. In another example, the zirconia, hafnia, and gadolinia may be used alone or in combination. For example, U.S. Pat. No. 6,924,040 and U.S. Pat. No. 6,284,323 provide example compositions. Given this description, one of ordinary skill in the art will recognize additional combinations or other types of ceramic materials to meet their particular needs.

Figure 4:
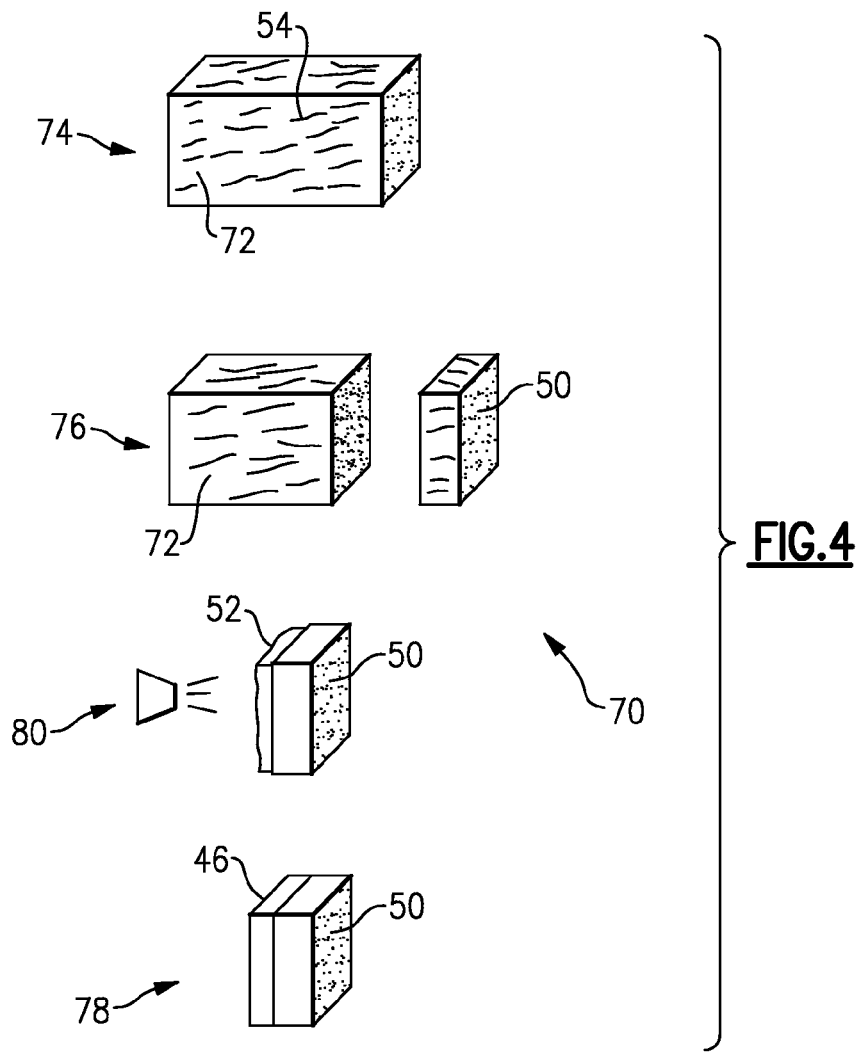
FIG. 4 illustrates an example method for manufacturing the seal member or other turbine engine component.

The ceramic member 50 may be pre-formed and then attached to the substrate 46. FIG. 4 illustrates an example method 70 of manufacturing the ceramic member 50 for use with the seal member 30 or other type of turbine engine component. In this example, a ceramic workpiece 72 having the ceramic reinforcement 54 in a particular orientation is formed at step 74. At step 76 the ceramic workpiece 72 is severed to produce the ceramic member 50. For example, the ceramic workpiece 72 is cut using a suitable cutting method, such as an abrasive media, a water jet, a laser, an abrasive tool, or other suitable method. In one example, the selected cutting method is suitable to produce a relatively smooth cut surface and a thickness of the ceramic member 50 that is about 150 mils (3.81 mm) or less. In a further example, the thickness of the ceramic member is about 15 mils (0.381 mm) or less.

At step 78, the ceramic member 50 is bonded to the substrate 46, such as by using a brazing process. Optionally, at step 80, the bond layer 52 is deposited onto the ceramic member 50. For example, the bond layer 52 may be thermally sprayed onto the ceramic member 50. The bond layer 52 may also be applied onto the ceramic member 50 as a paste, foil, or powder, or deposited by sputtering, vapor phase deposition, or chemical conversion deposition. Optionally, if the material of the bond layer 52 does not wet the ceramic member 50 as desired, an intermediate bond layer, such as MCrAlY, may be applied onto the ceramic member 50 to promote wetting. Alternatively, the bond layer 52 and/or intermediate bond layer may be applied onto the substrate 46 rather than on to the ceramic member 50.

The disclosed method 70 provides the benefit of producing a pre-formed thermal barrier layer having a structure that is thermally resistant to decrease or avoid sintering shrinkage related spallation and that can subsequently be attached to the substrate 46 for thermal protection.

Figure 5:
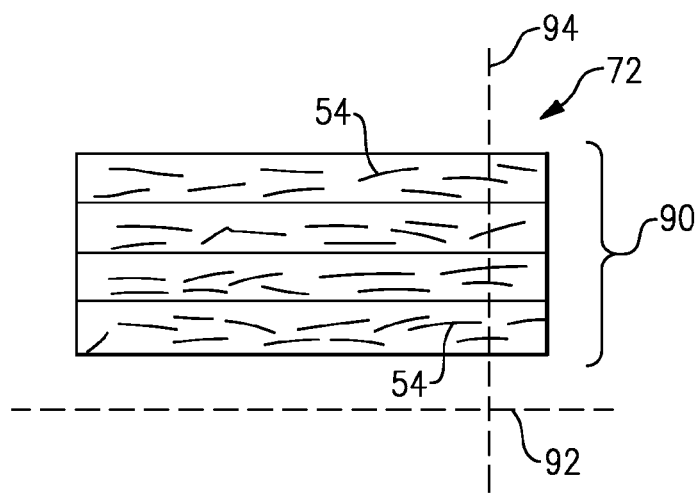
FIG. 5 illustrates an example ceramic workpiece used to manufacture a ceramic member.

FIG. 5 illustrates one example of forming the ceramic workpiece 72 at step 74. In this example, a plurality of layers 90 are formed adjacent to each other. For example, the layers may be slip cast from a slurry that includes a solvent, the ceramic reinforcement 54, and a ceramic powder and/or ceramic precursor that will subsequently form the ceramic matrix 56. Because each of the layers 90 has a finite thickness, the ceramic reinforcement 54 within each layer 90 is oriented within a plane of the layer 90. That is, the ceramic reinforcement 54 is substantially parallel to a plane 92 that is parallel to the layers 90. Thus, the term "substantially parallel" as used herein to describe the orientation of the ceramic reinforcement 54 indicates that the parallelism between the ceramic reinforcement 54 and the plane 92 may vary by an amount corresponding to the thickness of one layer 90, but does not include the ceramic reinforcement 54 being perpendicular to the plane 92. In some examples, at least a portion of the ceramic reinforcement 54 is expected to be exactly parallel to the plane 92 or at least parallel within a few degrees.

Alternatively, the ceramic reinforcement 54 may comprise continuous fibers instead of the discontinuous fibers shown in FIG. 5. The continuous fibers may be oriented parallel or substantially parallel to the plane 92. For example, the fibers may be pre-impregnated with a ceramic precursor that later forms the matrix 56, such as by using vapor phase condensation.

After forming the plurality of layers 90, the layers 90 may be pyrolized to remove the solvent and other sacrificial materials that may have been used within the slurry, such as binders, lubricants, and the like. The pyrolysis also sinters or reacts the ceramic precursor to form the matrix 56. In one example, the ceramic precursor comprises ceramic particles or nano-sized ceramic particles that sinter to form the matrix 56. In another example, the ceramic precursor comprises a pre-ceramic polymer that reacts at the pyrolysis temperature to form the matrix 56.

After pyrolysis, the layers 90 are severed at step 76, as described above, along a plane 94 that is substantially perpendicular to the plane 92 to produce the ceramic member 50.

The layers 90 may be severed at other angles besides perpendicular, depending upon the desired orientation of the ceramic reinforcement 54 in the ceramic member 50.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A thermal barrier layer comprising:
   a ceramic member defining a plane that is non-intersecting with a centerline of a gas turbine engine, the ceramic member having ceramic fibers disposed within a ceramic matrix such that the ceramic fibers are oriented substantially perpendicular to the plane, wherein at least one of the ceramic matrix or the ceramic fibers comprises stabilized zirconia, yttria stabilized zirconia or gadolinia zirconate, and a ratio of a percent theoretical density of the ceramic matrix to a volume of the ceramic fibers in the ceramic member is between 0.5 and 16 to control a contribution of the ceramic fibers to the strength of the ceramic member.

2. The thermal barrier layer as recited in claim 1, wherein the ceramic fibers comprise between about 10% and about 30% of the volume of the ceramic member.

3. The thermal barrier layer as recited in claim 1, wherein the ceramic matrix is between about 33% theoretical density and about 80% theoretical density.

4. The thermal barrier layer as recited in claim 1, wherein the ceramic member extends between two circumferential sides, a leading edge and a trailing edge, and a radially inner side and a radially outer side, wherein the ceramic member includes a thickness between the radially inner side and the radially outer side of about 150 mils (3.81 mm) or less.

5. The thermal barrier layer as recited in claim 1, further comprising a substrate bonded with the ceramic member, the substrate comprising at least one of a nickel alloy, an iron alloy, or a ceramic.

6. The thermal barrier layer as recited in claim 1, wherein the ceramic fibers and the ceramic matrix comprise at least one of yttria stabilized zirconia, zirconia, hafnia, or gadolinia.

7. The thermal barrier layer as recited in claim 1, wherein the ceramic fibers comprise at least one of zirconia, stabilized zirconia, or yttria stabilized zirconia.

8. The thermal barrier layer as recited in claim 1, wherein the ceramic fibers comprise hafnia.

9. The thermal barrier layer as recited in claim 1, wherein the ceramic fibers comprise at least one of gadolinia or gadolinia zirconate.

10. The thermal barrier layer as recited in claim 1, wherein at least one of the ceramic matrix or the ceramic fibers comprise at least one of alumina or mullite.

11. The thermal barrier layer as recited in claim 1, further comprising a bond layer adjacent the ceramic member.

12. The thermal barrier layer as recited in claim 11, wherein the bond layer comprises at least one of MCrAlY, a nickel alloy, platinum, gold, or silver, wherein the M comprises at least one of nickel, cobalt, iron, or a combination thereof, Cr is chromium, Al is aluminum, and Y is yttrium.

13. The thermal barrier layer as recited in claim 1, wherein at least one of the ceramic matrix or the ceramic fibers comprises stabilized zirconia.

14. The thermal barrier layer as recited in claim 1, wherein at least one of the ceramic matrix or the ceramic fibers comprises yttria stabilized zirconia.

15. The thermal barrier layer as recited in claim 1, wherein at least one of the ceramic matrix or the ceramic fibers comprises gadolinia zirconate.

16. The thermal barrier layer as recited in claim 1, wherein the ratio is between 1.1 and 8.

* * * * *